Patented Oct. 14, 1947

2,429,165

UNITED STATES PATENT OFFICE 2,429,165

VINYLIDENE CHLORIDE POLYMER COMPOSITIONS STABLE TO LIGHT

Lorne A. Matheson and Raymond F. Boyer, Midland, Mich., assignors to The Dow Chemical Company, Midland, Mich., a corporation of Delaware No Drawing. Application May 4, 1945,
Serial No. 592,076

2 Claims. (Cl. 260—92.5)

The present invention relates to compositions of matter comprising polymeric vinylidene chloride products and certain specific addition agents to serve as light stabilizers for the vinylidene chloride polymer.

The polymer of vinylidene chloride alone and copolymers of this material with other polymerizable substances have been described in many patents and printed publications during the past several years. The polymer of vinylidene chloride alone and its copolymers and plasticized compositions are herein referred to as "polymeric vinylidene chloride products." These products, or most of them, are capable of being molded or extruded to form useful articles under the combined effects of heat and pressure. Some of them exhibit sufficient solubility in organic solvents to permit their being cast as films. In most cases, the articles produced, either by molding, extrusion or by casting from solution of polymeric vinylidene chloride products, are subject to decomposition when exposed for prolonged periods to the effects of light, especially when the articles have thin sections and more particularly when such thin articles are subjected to light having a high concentration of ultraviolet radiations. Because of this apparent short-coming of articles produced from polymeric vinylidene chloride products, much attention has been paid to the provision of stabilizers for these products to prevent or to minimize the darkening effect which has been obtained when the products have been exposed to light.

It is among the objects of the present invention to provide compositions of matter comprising a polymeric vinylidene chloride product stabilized against the darkening and embrittling effects of light. A related object is to provide a stabilizer which is satisfactory for use in lacquers and similar coating compositions containing a polymeric vinylidene chloride product as the film-forming portion of the coating composition. Other and related objects may appear hereinafter.

We have now found that the foregoing and related objects may be attained through the incorporation in the polymeric product of an ester selected from the group consisting of the alkyl esters of citric acid, wherein the alkyl groups contain from 1 to 6 carbon atoms, and the corresponding esters of acyl citric acids, wherein the acyl group contains from 2 to 4 carbon atoms. Examples of such esters are the methyl, ethyl, n-propyl, isopropyl, n-butyl, isobutyl, tertiarybutyl, and the various amyl and hexyl esters of citric acid, acetyl citric acid, propionyl citric acid, and butyryl citric acid. The preferred esters in each case are the neutral, or trialkyl, esters of the particular acid involved, though it has been found that a certain stabilizing effect may be obtained from the dialkyl esters of citric and acyl citric acids. The esters employed may be mixed esters, having two or more different alkyl groups in the molecule. Especially advantageous members of the herein concerned class of stabilizers are tripropyl citrate, tributyl citrate, and acetyl tributyl citrate.

It has been found that the manner in which the stabilizer is added to the polymeric vinylidene chloride product is of minor importance so long as that method permits reasonably uniform distribution of the stabilizer throughout the polymeric composition. Thus, in the case of compositions to be used for molding or extrusion purposes, the stabilzer may be milled with the polymeric product, either with or without the aid of volatile dispersion media, in ball mills or on compounding rolls in the methods well known in the art. In the case of a copolymer which is soluble in organic solvents, the stabilizer may be added to a solution of the polymer, either directly or in the form of a previously prepared concentrated solution of the stabilizer in a solvent which is miscible with the solvent for the polymer.

Regardless of the manner in which the stabilizers of the present invention are added to the polymeric products, it has been found that they exhibit a beneficial stabilizing effect on the polymer and on articles made from it, when such articles are exposed to light. It has been previously recognized that an untreated film or filament of a polymeric vinylidene chloride product may assume a dark brown or black coloration after exposure to sunlight. By way of contrast, compositions containing relatively small amounts of the stabilizers described above, when exposed to sunlight for the same period of time and in the same physical state, are found to resist discoloration even when the exposure periods are of several months' duration. In all cases, the compositions containing the herein described stabilizers are much lighter in color, after exposure to light, than are the untreated compositions.

The following example illustrates the practice of the present invention:

The polymeric product employed in the comparative tests, set forth in the following table, was a copolymer of about 85 per cent vinylidene chloride and correspondingly about 15 per cent of ethyl acrylate. This copolymer is soluble in organic solvents, especially when the solvent medium contains dioxane, and is useful in the formation of coating compositions. To each of several samples of this copolymer was added an amount within the range of from about 1 to about 10 per cent of the stabilizer to be tested. Solutions were prepared and uniformly thin sheets of the stabilized compositions were obtained by casting films from the solution on clean glass plates. The deposited films, when dry, were 0.004 inch thick. The various samples were exposed to a high concentration of ultraviolet radiations in a fadeometer for a period of about 48 hours. an observation was made of the percent of the available visible light which was transmitted through the samples, but before and after exposure in the fadeometer. The change in the amount of light transmitted gives an indication of the amount of darkening and, hence, of the extent of decomposition on exposure to light.

Table

| Stabilizer | Concentration | | | | | |
|---|---|---|---|---|---|---|
| | 1 per cent Transmission | | 3 per cent Transmission | | 10 per cent Transmission | |
| | Before | After | Before | After | Before | After |
| Blanks | 88 | 64 | 88 | 64 | 88 | 64 |
| Triethyl citrate | 89 | 77 | 90 | 78 | 90 | 80 |
| Tripropyl citrate | 90 | 79 | 90 | 79 | 90 | 80 |
| Tributyl citrate | 90 | 78 | 90 | 78 | 90 | 83 |
| Acetyl triethyl citrate | 89 | 72 | 89 | 75 | 90 | 80 |
| Acetyl tripropyl citrate | 89 | 78 | 90 | 80 | 89 | 82 |
| Acetyl tributyl citrate | 90 | 81 | 90 | 81 | 89 | 82 |
| Propionyl triethyl citrate | 89 | 76 | 90 | 79 | 89 | 77 |

It is observed that each of the esters of citric acid or of acyl citric acids, reported in the foregoing table, improves the ability of the polymeric vinylidene chloride product to withstand the effects of continued exposure to light.

The invention has been illustrated with particular reference to the copolymer of vinylidene chloride and ethyl acrylate. The invention is not limited to its use in connection with this particular copolymer, but may be applied equally as effectively to other copolymers of vinylidene chloride, both of the soluble and insoluble types and including, but not limited to those with vinyl chloride, vinyl acetate, styrene, methyl methacrylate, vinyl cyanide, and similar polymerizable substances. In its practical application, the invention appears to be limited only by the requirement that the polymeric vinylidene chloride product to be treated is one which, without a light stabilizing agent, shows evidence of decomposition when exposed to light.

We claim:
1. A composition of matter comprising a polymeric vinylidene chloride product and, as a stabilizing agent therefor, an alkyl ester of an acyl citric acid, wherein the alkyl groups contain from 1 to 6 carbon atoms and the acyl group contains from 2 to 4 carbon atoms.
2. A composition of matter comprising a polymeric vinylidene chloride product and, as a stabilizing agent therefor, a tributyl ester of acetyl citric acid.

LORNE A. MATHESON.
RAYMOND F. BOYER.

REFERENCES CITED

The following references are of record in the file of this patent:

UNITED STATES PATENTS

| Number | Name | Date |
|---|---|---|
| 2,224,944 | Young | Dec. 17, 1940 |
| 2,273,262 | Hanson | Feb. 17, 1942 |

OTHER REFERENCES

Ind. and Eng. Chem., vol. 34, Jan. 1942, pp. 68 to 73.